United States Patent [19]

Ziese

[11] 4,103,960
[45] Aug. 1, 1978

[54] UTILITY COMPARTMENT FOR A TRAVEL TRAILER

[76] Inventor: Joe W. Ziese, P.O. Box 14209, Oklahoma City, Okla. 73114

[21] Appl. No.: 809,538

[22] Filed: Jun. 24, 1977

[51] Int. Cl.² .............................................. B60R 9/06
[52] U.S. Cl. .................................................. 296/37.1
[58] Field of Search .................... 296/37.1, 37.2, 37.3, 296/37.6, 1 R, 23 R, 28 R

[56] References Cited

U.S. PATENT DOCUMENTS

| | | | |
|---|---|---|---|
| 3,004,790 | 10/1961 | Mayer | 296/37.1 |
| 3,082,033 | 3/1963 | Bosher | 296/37.1 |
| 3,085,826 | 4/1963 | Carreau | 296/37.1 |
| 3,999,693 | 12/1976 | Cooper | 296/37.1 |

Primary Examiner—Richard A. Bertsch
Attorney, Agent, or Firm—Robert M. Hessin

[57] ABSTRACT

The present invention relates to a utility compartment, including propane powered generator and storage compartment, that is readily adaptable for rear end affixure to a travel trailer or motor home. The apparatus consists of a carrier support frame which may be rigidly interposed between the travel trailer frame and existing bumper structure, which carrier support frame then forms the bottom paneling and side support structure for receiving unitary side paneling. The apparatus is provided with a center divider panel defining a generator compartment and a storage compartment, and a top-opening lid is secured thereover for hinged opening and locked closure.

5 Claims, 8 Drawing Figures

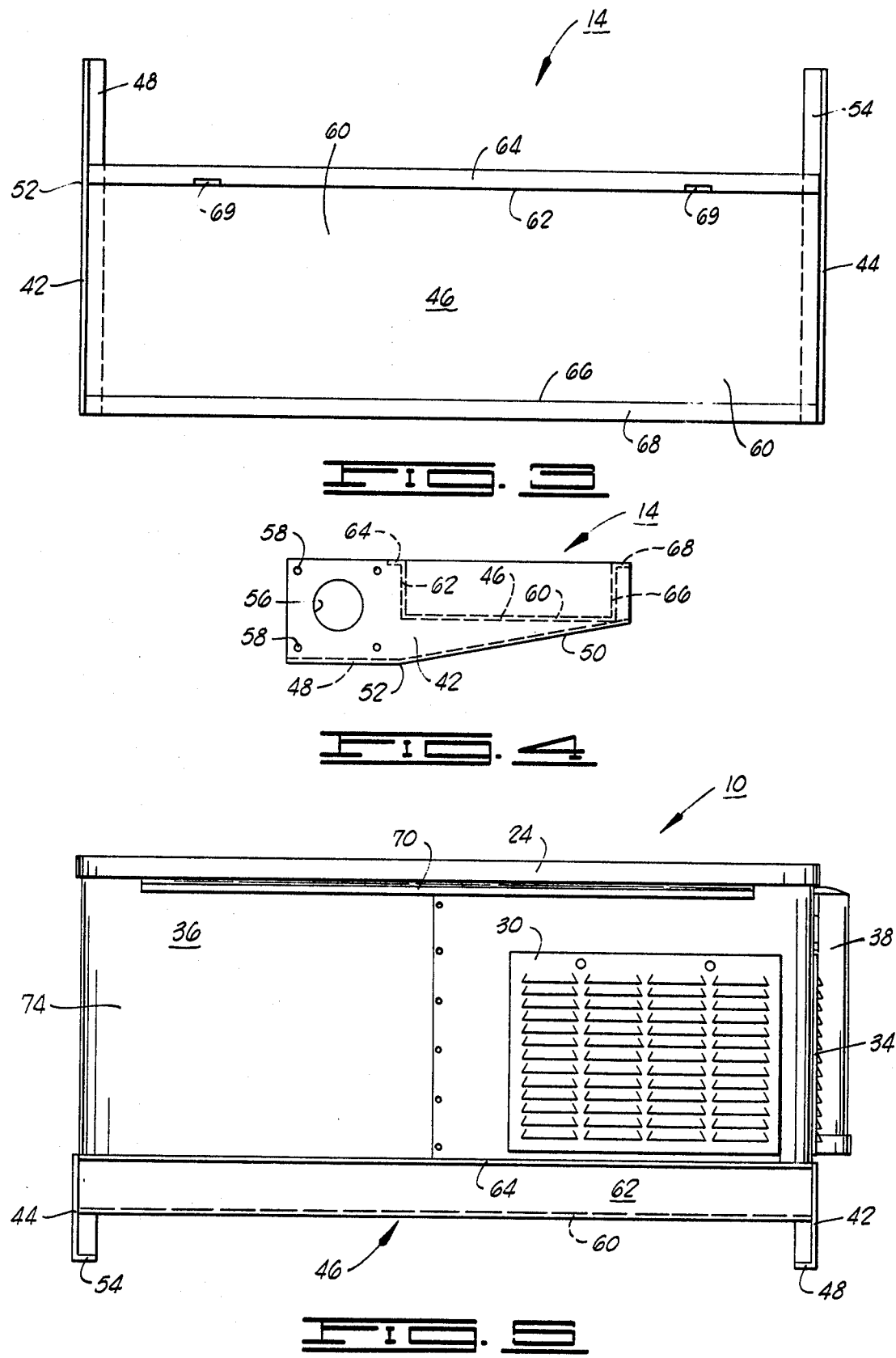

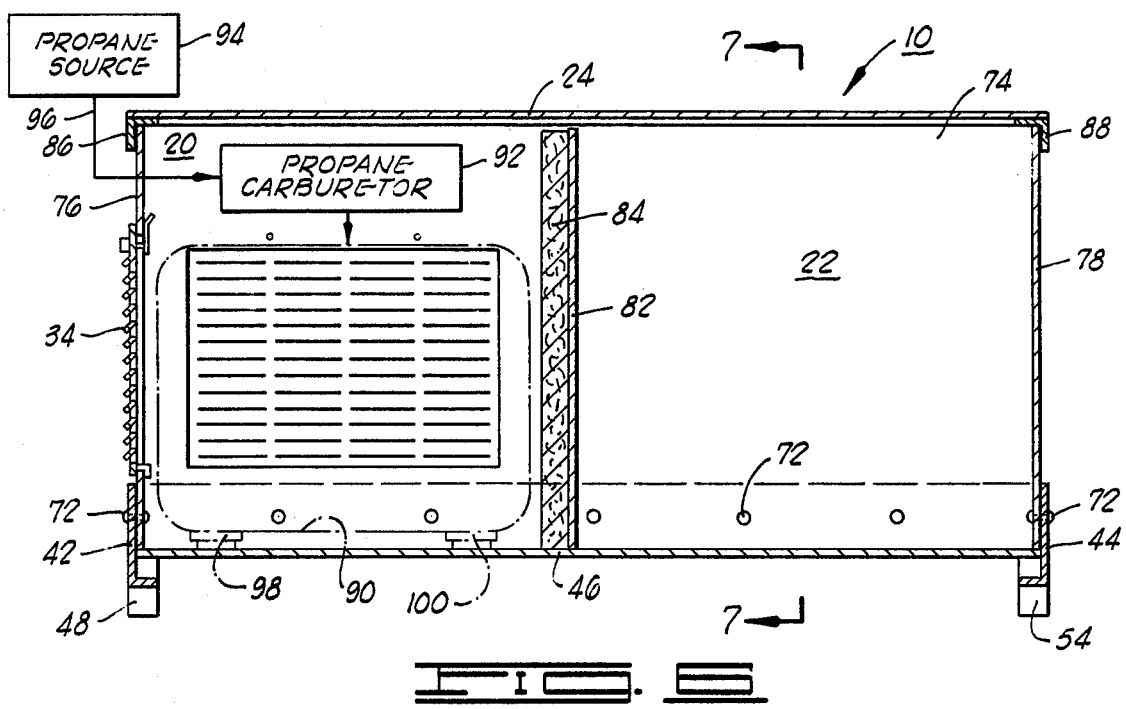
FIG. 6
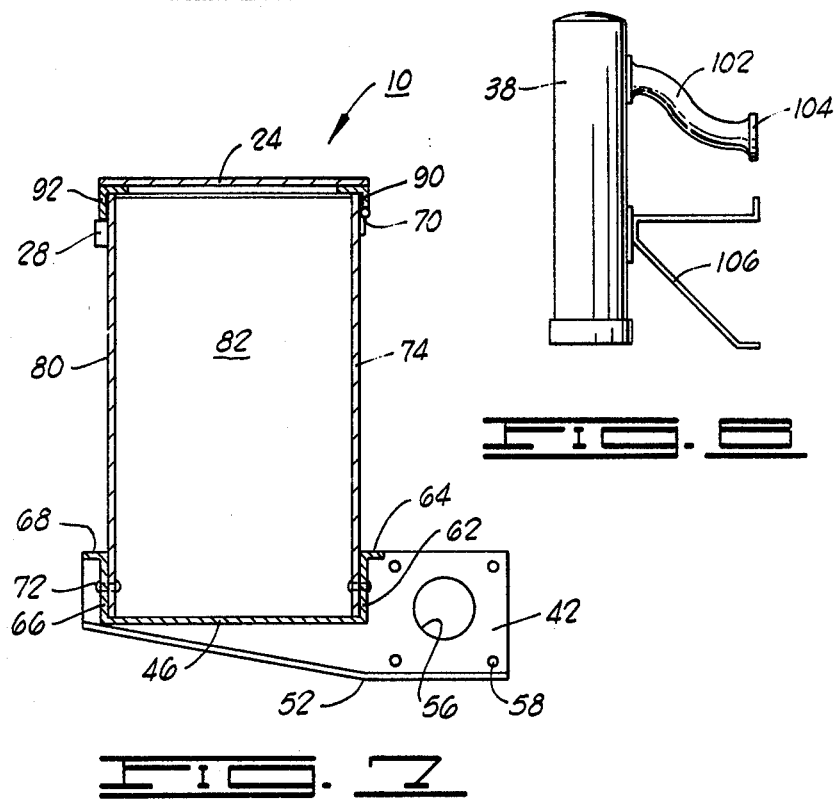
FIG. 7
FIG. 8

UTILITY COMPARTMENT FOR A TRAVEL TRAILER

BACKGROUND OF THE INVENTION

1. Field of the Invention

The invention relates generally to utility compartmentation for travel trailers and, more particularly, but not by way of limitation, it relates to an improved utility compartment which affords not only storage space but also a generation source of electrical power for utilization on living accommodation vehicles.

2. Description of the Prior Art

The prior art includes numerous types of generator structure addendum as well as extra storage compartmentation which are variously adapted for carriage by mobile trailers and the like. However, prior devices are of general construction and adaptability and must be utilized with a particular trailer or mobile home as they can best be affixed thereto. In many cases, such accouterment equipment must be secured in or on the trailer in unsightly and unwieldy manner so that any benefits of function and operability are considerably offset by the deleterious aesthetic effect.

SUMMARY OF THE INVENTION

The present invention contemplates a utility compartment having multiple capabilities that is adapted for ready, structurally rigid affixure to the rear end of a travel trailer. The apparatus provides for combinative attachment by being adapted for structurally rigid insertion between the main longitudinal framing of the travel trailer and the existing trailer bumper thereby combining with but utilizing the existing travel trailer components. The combinative apparatus includes a carrier support frame that coacts to provide the lower portion of a generally rectangular volumetric enclosure which includes an engine-generator assembly and a storage compartment; the enclosure further including an uplifting top lid which may be sealably locked in place during transit, as well as a plurality of ventilating access doors adjacent the engine-generator assembly.

Therefore, it is an object of the present invention to provide a utility compartment that is readily adaptable for secure attachment to a travel trailer.

It is also an object of the present invention to provide an apparatus which is useful in combination with a specific type and frame structure of travel trailer, and which affords a self-contained or internal electrical power generator that is operable from the on-board fuel source.

It is yet another object of the invention to provide a readily combinative utility compartment that is lightweight and functionally valuable while also maintaining the aesthetic design standards of the particular travel trailer.

Finally, it is an object of the present invention to provide a weatherproof utility compartment of selected design and material to provide an on-board electrical power source and storage compartment for use in combination with a design comparable travel trailer.

Other objects and advantages of the invention will be evident from the following detailed description when read in conjunction with the accompanying drawings which illustrate the invention.

BRIEF DESCRIPTION OF THE DRAWINGS

FIG. 3 is a top plan view of a carrier support frame constructed in accordance with the present invention;

FIG. 4 is a side elevation of the carrier support frame;

FIG. 5 is a front view of a utility compartment constructed in accordance with the present invention;

FIG. 6 is a transverse sectional view of the utility compartment of the present invention;

FIG. 7 is a vertical section of the entire utility compartment as taken along line 7—7 of FIG. 6; and FIG. 8 is an elevational view illustrating the muffler offset and affixture structure as utilized in the present invention.

DETAILED DESCRIPTION OF THE PREFERRED EMBODIMENT

Figure 1:
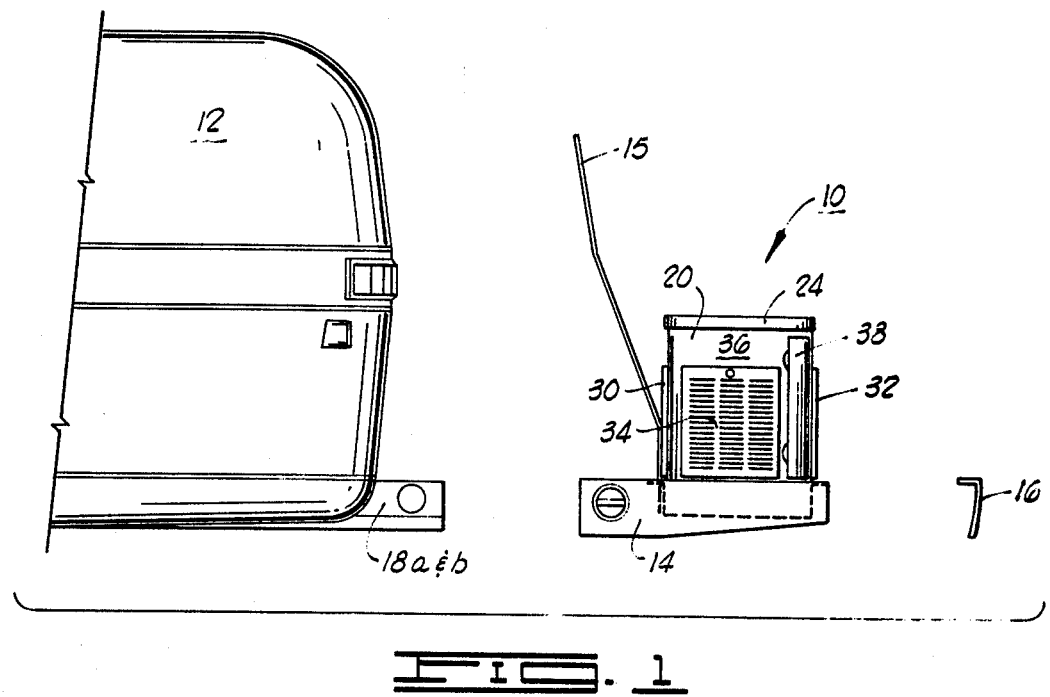
FIG. 1 is a view in side elevation of the combinative utility compartment as it may be affixed to the rear end of a particular form of travel trailer.
Figure 2:
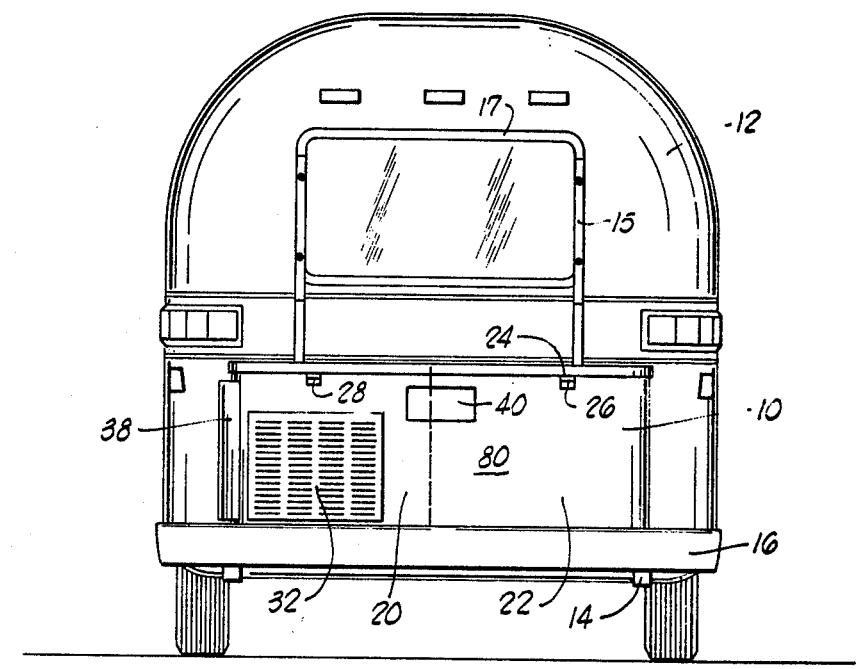
FIG. 2 is a rear elevation of the invention as shown in FIG. 1 when in assembled form.

Referring to FIGS. 1 and 2, a utility compartment 10 is illustrated in operational affixure to a travel trailer 12. The utility compartment 10 is supported by and integrally constructed with a carrier support frame 14; and is affixed by removal of the trailer bumper 16, insertion of utility compartment 10 by securing the carrier support frame 14 to opposite longitudinal side frames 18 of trailer 12, and, thereafter, resecuring trailer bumper 16 to the rear side of support frame 14. A pair of hanger straps 15, e.g., 1¼ inch by ⅜ inch aluminum strap, are then rigidly secured between support frame 14 and rear window framing 17. Straps 15 provide vertical support and lessen vibrational wear during road usage. In the particular illustration, the travel trailer 12 is shown to be a model known under the trademark AIRSTREAM, a quality travel trailer; but it should be understood that the utility compartment 10 and integral carrier support frame 14 can be adapted for similar affixure to any of various well-known types of trailers, mobile homes, camper combinations and the like.

As shown in FIG. 2, the utility compartment 10 is internally divided into a left side generator compartment 20 and a right side storage compartment 22, both of which are accessible through an upwardly opening top lid 24. Top lid 24 may be secured in a downward or closed position by means of conventional locks 26 and 28 disposed in equi-spaced relationship from each end of compartment 10. The generator side 20 of compartment 10 includes additional forward access door 30 (FIG. 1) and rear access door 32, as well as a side access door 34. Each of access doors 30, 32 and 34 are top lock and bottom hinged and are formed of suitable grille material of the predominantly open type, e.g., eighty-six percent open to air flow. The side paneling 36 of utility compartment 10 is formed preferably from a unitary sheet of aluminum, presently designated as 16 gauge aluminum sheet, which is secured within support frame 14, as will be further described below. Also, a muffler 38, coactive with the engine/generator within generator compartment 20, is affixed to the left side of compartment 10 in a manner that will also be further described. The license plate 40 and the attendant plate holder device may be removed from the trailer 12 and then re-secured to the rear side panel of utility compartment 10 in order to enable proper visual display.

FIGS. 3 and 4 illustrate the carrier support frame 14 in greater detail. The support frame 14 is formed of heavy gauge aluminum and consists of opposite side frames 42 and 44 joined by transverse panel 46. Side frame 42 is formed to have a lower, inwardly extending angle portion 48 extending along the length thereof. Side frame 42 is formed with a rearward upward taper 50, the angle portion 48 being welded or rolled at position 52 to maintain continuity along the length of side frame 42. The opposite side frame 44 is formed of similar but opposite shape and includes an inwardly extending angle portion 54 extending along the length thereof. As shown in FIG. 4, the left side frame 42 includes an access hole 56 for alignment with the existing sewage outlet of trailer 12, and holes 58 provide secure affixure as by bolts or similar fasteners to the longitudinal trailer frame 18a (FIG. 1).

The transverse panel 46, also formed of heavy gauge aluminum, is formed as a pan-shaped unitary piece having a bottom 60, forward panel 62, forward angle 64, rear panel 66 and rear angle 68. The transverse panel 46 is secured as by conventional aluminum welding transversely between side frames 42 and 44, and it further functions to provide the bottom panel and lower support structure for the utility compartment 10 when finally assembled, as will be further described. A pair of slots 69 are formed through the forward angle 64 in order to receive straps 15 downward therethrough; the straps 15 are then secured through forward panel 62 and side paneling 36 by suitable fasteners.

FIG. 5 illustrates the utility compartment 10 in front view. Thus, lid 24 is secured along the front edge by means of a suitable hinge 70, e.g., a piano-type hinge. Side paneling 36 is preferably formed of a unitary sheet of 16 gauge sheet aluminum which is formed to the proper size rectangle and inserted down within transverse panel 46 (FIG. 3) and secured therein. Thus, and as also shown in FIGS. 6 and 7, a suitable sealer such as silicone compound is inserted around the inner facings of side frames 42 and 44, forward panel 62 and rear panel 66 whereupon the rectangular side paneling 36 is inserted and securely riveted about its perimeter by means of rivets 72. The number and spacing of rivets 72 may be placed in accordance with requirements consonant with sufficient weatherproofing and structural rigidity. In this manner the side paneling 36 is formed to provide a front panel 74, right side panel 76, left side panel 78 and rear panel 80 while the bottom panel 60 forms the bottom of utility compartment 10.

With further reference to FIGS. 6 and 7, a generally centered divider panel 82 is suitably secured as by rivets, welding or the like transversely across compartment 10. Insulation 84, e.g., one inch rock wool, is then suitably bonded on the right side of divider panel 82, the generator compartment side 20. The storage compartment 22 is defined to be of relatively large space, on the order of thirty-one inches by twenty-four inches by seventeen inches in present design, and it is suitable for storage of items as large as folded deck chairs, etc.

The lid 24 is formed of a rectangular angle, rolled at the four corners, that is formed to define side members 86 and 88 and front and rear members 90 and 92 adapted in size and shape to envelop down over the upper comb of side paneling 36. A suitable sealer such as silicone compound is then placed on the upper surface of the angle member and top lid panel 24 is secured thereon as by bonding, riveting or other conventional fastener means.

The generator compartment 20 is adapted for containing a selected form of fuel powered generator to provide operating electrical power to travel trailer 12. In present design, a generator 90 is utilized that is a Honda Type ES-3500; however, the generator 90 is further modified by addition of a propane carburetor 92 as is commercially available from The Beam Corporation of Los Angeles, California. Thus, the generator 90 may be powered from a propane source 94 which is existent on travel trailer 12 and merely requires the leading of a supply tube 96 for input to propane carburetor 92 of generator 90. The generator 90 may be suitably shock mounted by means of resilient mounts 98 and 100 as secured to bottom transverse panel 46. Also, in certain cases where gasoline power of generator 90 is preferred, the Honda Type ES-3500 regular equipment tank may be utilized; or, two-way carburetors switchable between gasoline or propane are available for installation and these are controllable by remote selection from an operator position.

Operation of the generator 90 may be initiated from a position external to utility compartment 10 as it is equipped with a remote control unit which may be operated from the interior of travel trailer 12. Also, automatic start and 12 volt battery power may be supplied to generator 90 from the power supply on the travel trailer 12. Proper operation is considerably enhanced by further alteration as shown in FIG. 8 wherein the muffler 38 is extended for disposition outside of utility compartment 10. Thus, a curved manifold 102 is formed to provide a flange 104 for connection to the generator 90 and to be led through the side panel 76 with suitable weatherproof seal for connection to muffler 38. The lower end of muffler 38 is then further supported by a base 106 that also extends through side panel 76 in weatherproofed manner for adaptive bolt connection to the support frame of generator 90.

The foregoing discloses a unique form of utility compartment that is readily adaptive to existing forms of travel trailer, and which serves to provide additional storage space as well as an on-board electrical power generator. Thus, addition of the utility compartment to the travel trailer enables greater freedom of movement whereby the trailer occupants are not limited to those stops where plug-in electrical power can be obtained. Inclusion of the on-board generator system removes all limits as to where the trailer can go, stop and maintain livable conditions in finest style. In addition, storage space on-board such travel trailers is always at a premium and the provision of the additional weatherproof storage space is to be greatly appreciated.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. Utility compartment apparatus for installation and use on a vehicle of the type having on-board living accommodations and which has at least two spaced, longitudinal frame members extending rearward from the vehicle to support the rear bumper assembly, the apparatus comprising:

carrier support frame means having first and second side members each adapted for rigid affixure to said longitudinal frame members, and having a transverse panel with forward and rearward parallel sides bend-formed to extend at 90° upward from said transverse panel, said transverse panel being rigidly secured between said first and second side panels;

side panel means formed as a rectangular enclosure and inserted downward within said first and second side members and said transverse panel parallel bend portions for secure affixure therein;

top lid means hingedly secured over the top of said side panel means rectangular enclosure;

divider panel means secured generally centrally to said transverse panel and said side panel means rectangular enclosure;

electrical power generation means resiliently secured to said transverse panel on a selected side of said divider panel means; and a muffler and muffler extension means maintaining said electrical power generation means exhaust outlet external to said utility compartment.

2. Apparatus as set forth in claim 1 wherein said electrical power generation means comprises:

reciprocating engine means providing rotational output to an electrical power generator, said engine means having a propane carburetor receiving fuel from the existing propane supply of said vehicle.

3. The apparatus of claim 1 wherein said top lid means comprises:

an angle member having four roller-formed corners that is formed into a rectangular shape having uniplanar top surface and downwardly extending flanges for insertion down over said side panel means rectangular enclosure; and top panel means which is sealingly and rigidly affixed on the top surface of said angle member.

4. Apparatus as set forth in claim 1 which is further characterized in that:

the rearward end of said first and second side members and said rearward parallel side of said transverse panel are adapted to receive the vehicle bumper assembly.

5. Apparatus as set forth in claim 2 which is further characterized to include:

a plurality of hinged door panels of generally open air flow construction that are disposed in said side panel means adjacent said electrical power generation means.

* * * * *